May 29, 1962     C. A. SALISBURY     3,036,594

UNIVERSAL POSITION CHECK VALVE

Filed June 26, 1959

INVENTOR.
CLIFFORD A. SALISBURY
BY *Jerry J Dunlap*
ATTORNEY 3,036,594
UNIVERSAL POSITION CHECK VALVE
Clifford A. Salisbury, 1110 N. Main, Tonkawa, Okla.
Filed June 26, 1959, Ser. No. 823,166
1 Claim. (Cl. 137—536)

This invention relates generally to improvements in valves, and more particularly, but not by way of limitation, to an improved check valve for preventing retrograde flow of a liquid stream.

In many hydraulic systems, and particularly water systems, two difficult problems frequently occur simultaneously. Firstly, it may be desirable, or even imperative, to provide a check valve in a flow line of the system to provide a retrograde flow of the hydraulic fluid being handled, without decreasing the normal capacity of the flow line. Secondly, the hydraulic fluid may contain foreign matter, such as sand, and the foreign matter cannot be allowed to interfere with a rapid and efficient closing of the check valve upon the imposition of a pressure differential across the check valve in a direction to close the valve.

The first of these problems (the use of a check valve without decreasing the normal capacity of a flow line) can be solved by the use of a check valve substantially larger in diameter than the flow line. However, the larger the valve being used, the greater the cost involved, and space limitations frequently prevent the use of a check valve wherein the body of the check valve is substantially larger in diameter than the remainder of the flow line. As a result, many different check valves have been designed which utilize a tubular valve body slightly larger in diameter than the flow line in which the valve is to be used, and a circular valve head mating with an annular seat in the valve body to provide substantial clearance around the head when the head is removed from the seat, as well as substantial clearance between the head and the seat when the valve is opened. However, most previous valve designs of this type have utilized a valve stem extending axially from the valve head through a sleeve type guide held in the central portion of the valve body to maintain the valve head in alignment with the seat. Such valve stems frequently become lodged in the guides by sand or other foreign matter packing into the guide around the outer periphery of the stem, since the guides are subject to a minimum washing action by the fluid flowing through the valve. Also, the sand or other foreign matter causes a substantial amount of wear of the guides and stems.

The present invention contemplates a novel check valve construction wherein the entire valve will have a diameter only slightly larger than the diameter of the flow line in which the valve is interposed; the valve will provide substantially no restriction to the normal flow of hydraulic fluid through the valve, and the operation of the valve will not be impaired by a normal amount of sand or other foreign matter in the hydraulic fluid being handled. More specifically, the present invention contemplates a check valve for controlling the flow of a stream of liquid, comprising a tubular body having an inlet end and an outlet end for passage of the stream therethrough, a circumferential flange extending around the inner periphery of the body, an annular-shaped valve seat formed around the inner periphery of said flange and facing the outlet end of the body, a cylindrically-shaped valve head having a forward end and a rear end and having an annular seating area around the forward end portion thereof shaped to mate with the valve seat, a plurality of ribs formed along the inner periphery of the body parallel with the longitudinal axis of the body between the valve seat and the outlet end of the body, said ribs being circumferentially spaced around the inner periphery of the body and extended radially into the body a sufficient distance to slidingly support the valve head therebetween in alignment with the valve seat, and a spring anchored between the ribs and the valve head urging the valve head toward the valve seat. With this construction fluid can flow freely between the guides with a minimum restriction when the valve is open, and the fluid will continually wash foreign matter through the valve to keep the valve head freely operative.

An important object of this invention is to provide a check valve which will have an outer diameter only slightly larger than the outer diameter of a flow line in which the valve is interposed, and yet the valve will not provide an appreciable restriction in the normal flow capacity of the flow line.

Another object of this invention is to provide a free flowing type of check valve having a minimum outer diameter and which will not be fouled by a normal amount of foreign matter in the hydraulic fluid being handled by the valve.

A further object of this invention is to provide a novel guiding and spring construction for the valve head of a check valve which will not be fouled by foreign matter entrained in hydraulic fluid handled by the valve.

A still further object of this invention is to provide a check valve which may be used in any position; which is simple in construction, which may be economically manufactured, and easily repaired, and which will have a long service life.

Other objects and advantages of the invention will be evident from the following detailed description, when read in conjunction with the accompanying drawings which illustrate my invention.

Figure 1:
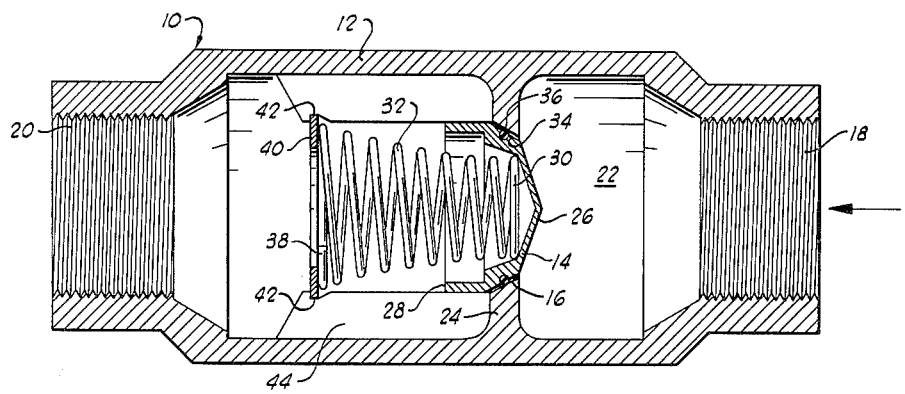
FIGURE 1 is a longitudinal sectional view through a check valve constructed in accordance with this invention, illustrating the valve in a closed position.
Figure 2:
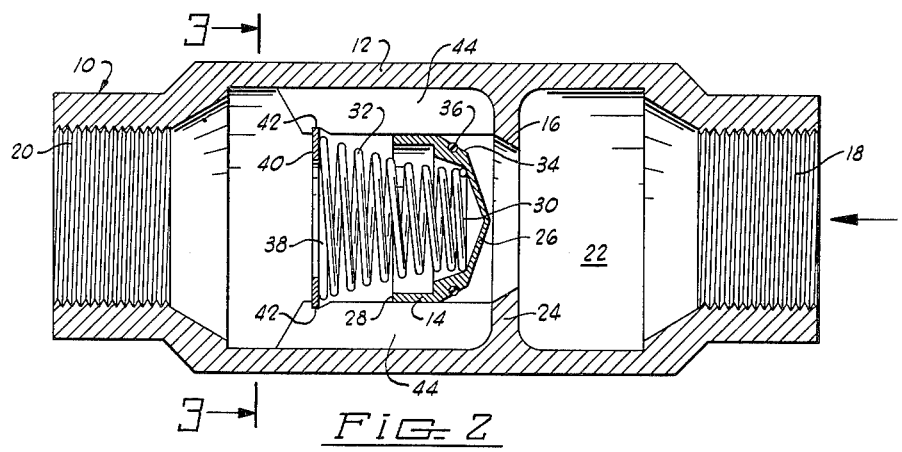
FIGURE 2 is a view similar to FIG. 1 illustrating the valve in an open position.

Referring to the drawings in detail, and particularly FIGS. 1 and 2, reference character 10 generally designates a check valve constructed in accordance with this invention and which comprises a tubular valve body 12 having a valve head 14 slidingly disposed therein to cooperate with a valve seat 16 in controlling the flow of liquid through the valve. The valve body 12 has an inlet end 18 and an outlet end 20 which are constructed in any suitable manner, such as with the provision of internal threads, as illustrated, for connection of the valve body 12 in a flow line (not shown). Both the inner and outer diameters of the valve body 12 are increased between the inlet 18 and outlet 20 to provide a valve chamber 22 in the valve body having a diameter slightly larger than the diameter of the flow line in which the valve 10 is interposed.

A circumferential flange 24 extends inwardly from the valve body 12 into the valve chamber 22 in the medial portion of the valve chamber, but closer to the inlet end 18 than the outlet end 20. The valve seat 16 is preferably provided by merely tapering the inner periphery of the circumferential flange 24 in a direction such that the valve seat 16 faces the outlet end 20 of the valve. It will be understood, however, that the valve seat 16 may be any suitable annular-shaped valve seat rigidly secured to the circumferential flange 24. It may also be noted that the flange 24 is preferably cast integrally with the valve body 12 to provide an economical construction.

The valve head 14 is preferably cup-shaped with the forward end 26 thereof tapered in the manner of a cone, and the rear end 28 thereof open to receive the forward end portion 30 of a helical spring 32. It should also be noted that the valve head 14 is cylindrical in configuration and has an annular area 34 around the forward end portion thereof shaped to mate with the valve seat 16 and prevent a retrograde flow of fluid through the valve. Also, I prefer to secure a suitable sealing ring 36, such as an O-ring, in a complementary circumferential groove in the seating area 34 to engage the valve seat 16 and assure that no leakage will occur through the valve when the head 14 is seated on the valve seat 16.

In order to protect or shield the annular seating area 34 from being abraded or eroded by the impingement thereon of fluid passing through the valve, the forward end 26 of the valve head 14 is formed in conical shape and defines with the annular seating area 34, an obtuse angle, as illustrated in FIGURES 1 and 2 of the drawings. This construction assures that fluid passing into the valve body 12 through the inlet 18 will initially strike the tapered forward end 26 of the valve head and will be deflected by this tapered end radially outward around the annular seating area 34 without coming in contact therewith.

The rear end 38 of the helical spring 32 is anchored against a snap ring 40 secured in complementary grooves 42 formed in the rear ends of ribs 44 extending along the inner periphery of the valve body 12 from the flange 24 toward the outlet end 20 of the valve. The helical spring 32 should be reduced in diameter from the snap ring 40 toward the valve head 14 such that the spring 32 may telescope freely into the valve head 14 when the valve is open, as illustrated in FIG. 2. It will be apparent that with the spring 32 anchored between the snap ring 40 and the valve head 14, the spring 32 will constantly urge the valve head 14 toward the valve seat 16 against the force of fluid flowing through the inlet end 18 of the valve to close the valve when the inlet pressure of the fluid is reduced to a predetermined amount.

Figure 3:
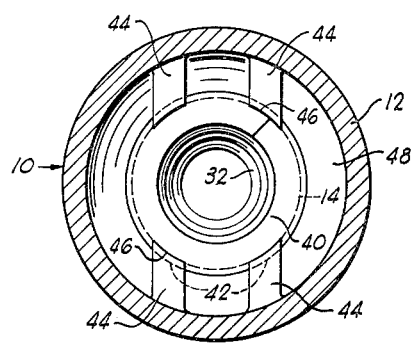
FIGURE 3 is a sectional view through the valve as taken along lines 3—3 of FIG. 2.

As illustrated most clearly in FIG. 3, the ribs 44 extend parallel with the longitudinal axis of the valve body 12 and extend radially inward into the valve chamber 22 a sufficient distance to slidingly support the valve head 14 in alignment with the valve seat 16. It is preferred that the inner edges 46 of the ribs 44 are curved on the arc of a circle having a radius substantially equal to the radius of the valve head 14 to slidingly support the valve head 14 and efficiently guide the valve head 14 into the valve seat 16. It is also preferred to provide the ribs 44 in diametrically opposed pairs, with the spacing between each pair being less than 90 degrees, as measured around the inner periphery of the valve body 12, since such a configuration has proven to be the most economical when the ribs 44 are cast integrally with the valve body 12. Furthermore, the cross-sectional area of the annulus 48 around the valve head 14 between the ribs 44 should be at least equal to the opening through the valve seat 16, such that any liquid flowing through the valve seat 16 will not be restricted upon passage around the valve head 14, as will hereinafter more fully appear.

*Operation*

In assembling the valve 10, the valve head 14 is inserted through the outlet end 20 of the body 12 with the forward end 26 of the valve head being inserted first. The valve head 14 may be easily slipped between the inner edges 46 of the ribs 44 into a position where the seating area 34 of the valve head engages the seat 16 as illustrated in FIG. 1. It may also be noted that when the opposite ends of the valve body 12 are threaded as illustrated in the present embodiment, the valve seat 16 will have a diameter substantially equal to the inner diameter of the flow line in which the valve 10 is interposed. Thus, the valve seat 16 will have a diameter slightly less than the diameter of the outlet 20, and since the largest diameter of the valve head 14 is substantially equal to the largest diameter of the valve seat 16, the valve head 14 may be easily inserted through the outlet 20. The helical spring 32 is then inserted through the outlet 20 and the smaller end 30 of the spring is telescoped into the open end 28 of the valve head 14. Lastly, the snap ring 40 is inserted through the outlet 20 and positioned in the grooves 42 by slightly compressing the helical spring 32. The valve 10 is then ready for installation in a flow line.

Fluid flowing into the inlet end 18 of the valve 10 and into the valve chamber 22 will contact the forward end 26 of the valve head 14. If the pressure of this fluid is sufficient to overcome the force exerted on the valve head 14 by the spring 32, the head 14 will be forced rearwardly between the ribs 44 to an open position as illustrated in FIG. 2. The incoming fluid flowing through the inlet 18 and the forward end portion of the valve chamber 22 will then flow through the valve seat 16 and will be diverted by the tapered forward end 26 of the valve head 14 around the annular seating area 34 and around the valve head 14 between the ribs 44. As previously indicated, the annulus 48 around the valve head 14 between the ribs 44 is at least as large in cross-sectional area as the opening through the valve seat 16, such that fluid flowing through the valve seat 16 will be unrestricted in flowing around the valve head 14 in an open position of the valve. It may also be noted that the tapered configuration of the forward end 26 of the valve head 14 will deflect the incoming fluid and foreign matter toward the inner periphery of the valve body 12 away from the helical spring 32. Also, since the open end 28 of the valve head 14 is extended in the same direction as the flow of fluid through the valve, a minimum of foreign matter will tend to collect in the valve head 14 to interfere with the action of the spring 32.

When the pressure of the fluid directed into the inlet end 18 of the valve 10 is decreased to a predetermined amount, the helical spring 32 will overcome the pressure of this fluid acting on the forward end 26 of the valve head 14 and will move the valve head 14 into a closed position as illustrated in FIG. 1. In this position of the valve, the sealing ring 36 will provide an efficient seal with the valve seat 16 to prevent any possible retrograde flow of fluid through the valve. It may also be noted that since the spring 32 is reduced in diameter from the snap ring 40 toward the valve head 14, the spring will have the minimum tendency to be fouled by movement of the valve head 14 and will telescope freely in and out of the valve head 14. Furthermore, the fluid flowing around the valve head 14 when the valve is opened will continuously wash around the outer periphery of the valve head to minimize the possibility of any foreign matter becoming entrained between the contacting surfaces of the valve head 14 and the inner edges 46 of the ribs 44, such that the valve head 14 will remain free to open and close upon pressure variations of the fluid directed to the valve.

From the foregoing it will be apparent that the present invention provides a check valve having an outer diameter only slightly larger than the outer diameter of a flow line in which the valve is interposed and yet the check valve will provide no appreciable restriction against normal flow through the flow line. In other words, when the valve is open, fluid may flow through the valve substantially as freely as it flows through the flow line in which the valve is interposed. The novel guide and spring construction of the present valve will provide an effective closing of the valve and will not be impaired by a normal amount of foreign matter in the hydraulic fluid being handled by the valve. Fluid flowing through the valve will continuously wash the guiding surfaces to prevent a collection of foreign matter. Also, the valve may be easily disassembled for repair or replacement of parts. It will be further apparent that the present valve is simple in construction, may be economically manufactured, and will have a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claim.

I claim:

A check valve for controlling the flow in a stream of liquid, comprising a tubular body having an inlet end and an outlet end for passage of the stream therethrough; a circumferential flange extending around the inner periphery of the body; an annular-shaped valve seat around the inner periphery of said flange and being tapered at an angle with respect to the axis of said tubular body to face the outlet end of the body; a cylindrically-shaped valve head having a closed forward end and an open rear end, and having an annular, frusto conical seating area around the forward end portion thereof shaped to mate with the valve seat, said valve head further having the extreme forward end thereof of conical configuration, with said conical extreme forward end spaced forwardly and inwardly of said annular seating area, and said conical extreme forward end being tapered at a larger angle with respect to the axis of said tubular body than said annular-shaped valve seat whereby the fluid flowing through said tubular body impinges upon said conically-shaped extreme forward end and is diverted outwardly around said seating area without establishing substantial contact therewith; a plurality of ribs formed along the inner periphery of the body parallel to the longitudinal axis of the body between the valve seat and the outlet end of the body, said ribs being circumferentially spaced around the inner periphery of the body and extended radially into the body a sufficient distance to slidingly support the valve head therebetween in alignment with the valve seat, the combined cross-sectional area between said ribs being at least as large as the cross-sectional area of the opening through the seat to prevent restriction of flow of fluid through the valve head when the valve is open; a snap ring anchored parallel with said circumferential flange in mating grooves adjacent the ends of said ribs nearest the outlet end of said tubular body; and a helical spring anchored between said snap ring and said valve head and urging the valve head toward said valve seat.

References Cited in the file of this patent

UNITED STATES PATENTS

| | | |
|---|---|---|
| 277,227 | Carter | May 8, 1883 |
| 455,913 | Walker | July 14, 1891 |
| 1,710,635 | Wertz | Apr. 23, 1929 |
| 1,871,285 | Tursky | Aug. 9, 1932 |
| 2,603,452 | Spinney | July 15, 1952 |
| 2,912,001 | Green | Nov. 10, 1959 |
| 2,918,083 | Clark, et al. | Dec. 22, 1959 |

FOREIGN PATENTS

| | | |
|---|---|---|
| 1,086,204 | France | Aug. 4, 1954 |